United States Patent [19]

Villemin et al.

[11] Patent Number: 4,656,692
[45] Date of Patent: Apr. 14, 1987

[54] APPARATUS FOR HOLDING A GUTTED ANIMAL BODY

[75] Inventors: Daniel Villemin, Chennevieres sur Marne; Paul Romand, Valence, both of France

[73] Assignees: Etablissements Arrive S.A., Saint Fulgent; Union Financiere pour le Development de l'Economie Cerealiere-Unigrains, Paris, both of France

[21] Appl. No.: 865,166

[22] Filed: May 20, 1986

[30] Foreign Application Priority Data

May 20, 1985 [FR] France .................................. 85 08275

[51] Int. Cl.$^4$ .............................................. A22C 21/00
[52] U.S. Cl. ..................... 17/44.1; 269/48.1; 17/1 G
[58] Field of Search ............. 17/11, 44, 44.1, 46, 17/1 G; 269/48.1, 50, 51, 22, 25, 901, 206

[56] References Cited

U.S. PATENT DOCUMENTS

| | | | |
|---|---|---|---|
| 3,194,466 | 7/1965 | Davis | 269/48.1 X |
| 3,330,021 | 7/1967 | Jacobsen | 269/48.1 X |
| 3,624,863 | 12/1971 | Gasbarro | 17/11 |
| 4,385,419 | 5/1983 | Cantrell | 17/46 X |

*Primary Examiner*—Willie G. Abercrombie
*Attorney, Agent, or Firm*—Karl F. Ross; Herbert Dubno

[57] ABSTRACT

An apparatus for holding a gutted animal body having an empty body cavity that has an open end and a closed end has an elongated holder body having a front portion and a rear portion offset along a longitudinal axis of the holder body from the front portion. The portions are interconnected for relative axial displacement between an adjacent position and an axially extended position. A holder is provided on the front portion for engaging same in the closed end and another holder is provided on the rear portion for engaging same adjacent the open end when the holder of the front portion is engaged with the closed end. The system is operated such that, on engagement of the holder body in the body cavity with the portions in the adjacent position, the rear holder is engaged with the animal body adjacent the respective end, the front and rear portions are axially extended away from each other, and then the front holder is engaged with the respective cavity end.

11 Claims, 7 Drawing Figures

APPARATUS FOR HOLDING A GUTTED ANIMAL BODY

FIELD OF THE INVENTION

The present invention relates to an apparatus for holding an animal body. More particularly this invention concerns such an apparatus which holds the gutted body of an animal body while it is cut up, trimmed, or otherwise processed in a meat-packing plant.

BACKGROUND OF THE INVENTION

In a meat-packing operation the animals in question, for instance chickens, turkeys, or rabbits, are first plucked or skinned and then gutted, that is the viscera are removed to leave an internal body cavity open at one end or the other of the animal, depending on type. The thus gutted body is then often subjected to subsequent operations, such as trimming off fat, deboning, or cutting up into parts. A turkey body or carcass is, for instance, typically stripped of the breast meat, the wings and legs are removed for separate sale, and the remaining largely meatless body is either discarded or turned into pet food.

Such operations are almost invariably carried out manually on an assembly line, as the variation of size and shape from animal to animal is too great to allow any meaningful amount of automation to be used. Thus once the animal is gutted it is typically hung from a hook of a conveyor apparatus that moves in steps along a path at which workers perform the various operations.

In order to minimize waste, that is meat left on the skeleton, it is advisable to provide some sort of rack or holder for the gutted body so that same is held in such a manner that the workpiece constituted by this body is always presented to the workers in such a manner as to allow them to operate efficiently and always in the same manner. A rack that is connected externally to the body cannot work when the size range of the animals being worked on is relatively great

OBJECTS OF THE INVENTION

It is therefore an object of the present invention to provide an improved holder for a gutted animal body.

Another object is the provision of such a holder for a gutted animal body which allows such a gutted animal to be held solidly in a manner to allow it to be worked on easily and efficiently.

SUMMARY OF THE INVENTION

An apparatus for holding a gutted animal body having an empty body cavity that has an open end and a closed end according to the invention has an elongated holder body having a front portion and a rear portion offset along a longitudinal axis of the holder body from the front portion. The portions are interconnected for relative axial displacement between an adjacent position and an axially spaced position. A holder is provided on the front portion for engaging same in the closed end and another holder is provided on the rear portion for engaging same adjacent the open end when the holder of the front portion is engaged with the closed end. The system is operated such that, on engagement of the holder body in the body cavity with the portions in the adjacent position, one of the holders is engaged with the animal body adjacent the respective end, the front and rear portions are axially extended away from each other, and then the other holder is engaged with the respective cavity end.

Normally according to this invention the rear holder is engaged at the rear cavity end, then the two portions are moved axially apart, and then the front holder is operated.

The instant invention is based on the principle of fitting the holder within the empty body cavity formed when the viscera are removed from the animal body. This body cavity is of generally circular section and is defined, for example in a turkey, by the spine, the sternum, and the ribs. The front end of the cavity is closed by the bony structure of the coracoid and by the ventral inflection of the spine. The rear end of this cavity is defined by the spine and the bones of the pelvis. In fact this cavity is of generally the same shape and is defined by generally the same skeletal structure in four-legged animals such as rabbits, pigs, or even cattle, and even fish have, when gutted, a similarly shaped body cavity. Thus the holder of the instant invention works with many different types of animals, and even with a wide range of sizes.

According to a feature of this invention the rear portion of the holder body is provided with an abutment engageable axially with the animal body around the open cavity end and thereby limiting insertion of the holder body into the cavity. The animal body has a spine exposed in the cavity and the front portion is formed with an axially extending and outwardly open groove into which the spine is engageable so that the animal will be perfectly centered on the holder. Furthermore the holder of the rear portion includes elements laterally engageable with the cavity. These elements are centrally articulated arms each having one end secured to the rear body portion and another end axially displaceable relative to the respective one end. Thus movement of the other end toward the one arm end engages the arm outward against the cavity. A pneumatic cylinder in the holding body effects this flexion of the arms. For best hold each of the articulated arms lies and moves in a plane extending along the axis and inclined such that the arm moves somewhat ventrally when extended. Thus as the arms are extended the rear portion is pushed against the back of the cavity and the front is spread somewhat.

The front portion of the system of this invention has a dorsally inclined front end provided with an inflatable bladder constituting the front holder so that when inflated it engages the sternum of the animal body. A pneumatic cylinder, provided like that of the rear portion with a pressure-limiting valve, is engaged between the two body portions to move them axially relative to each other. In this manner damage to the animal body is minimized.

DESCRIPTION OF THE DRAWING

The above and other features and advantages will become more readily apparent from the following, reference being made to the accompanying drawing in which.

SPECIFIC DESCRIPTION

Figure 1:
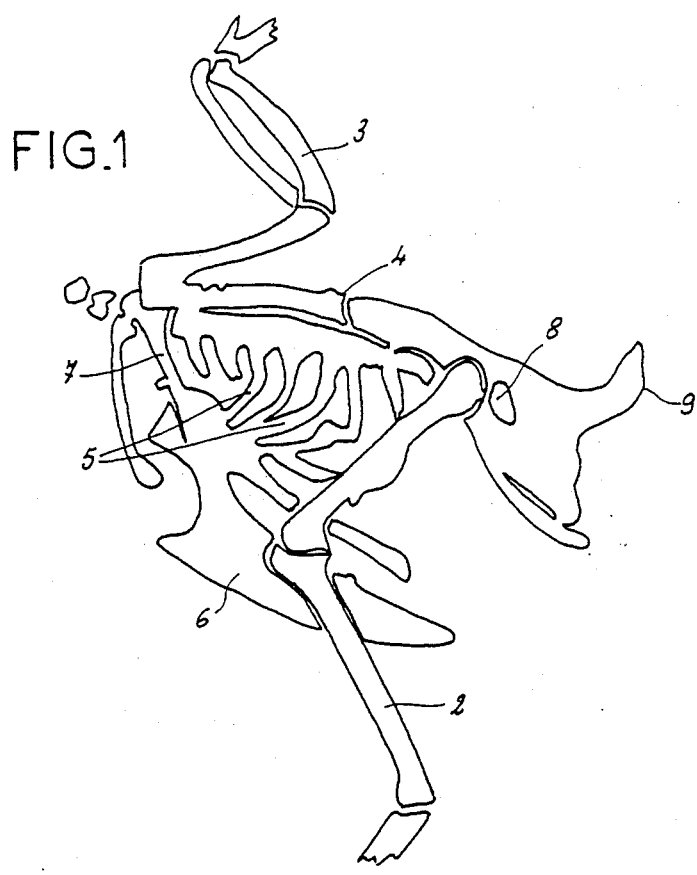
FIG. 1 is a mainly schematic side view of the skeleton of a chicken.

As seen in FIG. 1 a standard chicken or turkey skeleton has legs 2, wings 3, a spine 4, ribs 5, and a sternum 6. A body cavity is defined behind the sternum 6, in front of the spine 4, between the ribs 5, and below and behind the coracoid 7. The sciatic foramen or iliac opening 8 is also shown as well as the pygostyle 9. Substantially the same structure or equivalents are present in most food animals.

Figure 2:
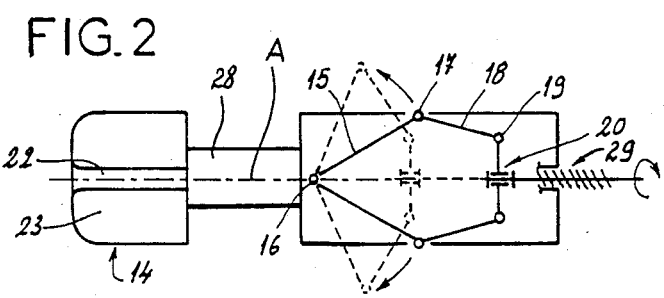
FIGS. 2 and 3 are respectively schematic top and side views of the apparatus of this invention.
Figure 3:
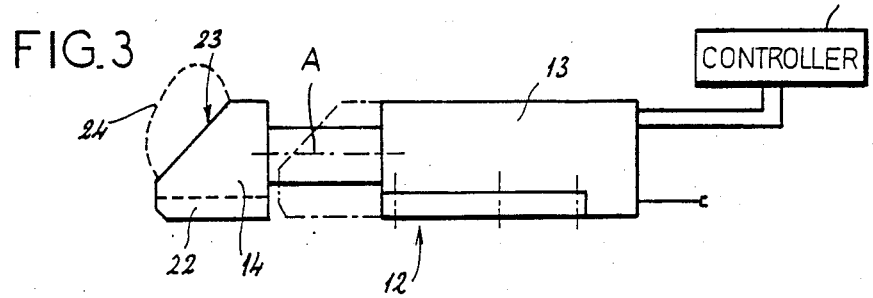

As seen in FIGS. 2 and 3 the apparatus of the invention has a body 12 formed of a rear body portion 13 and a front body portion 14 elongated along an axis A and interconnected by the piston rod 28 of a pneumatic cylinder in the rear portion 13. The front portion 14 can move between the rear retracted position shown in dot-dash lines in FIG. 3 and in solid lines in FIGS. 4 and 5 and the forward advanced position shown in solid lines in FIGS. 2, 3, 6, and 7 under the control of a controller 27 shown diagrammatically in FIG. 3.

A pair of articulated arms 15, 18 have front sections 15 with front ends pivoted together at 16 on the center of the rear portion 13 and rear ends pivoted at 17 to the front ends of rear sections 18 pivoted in turn at their rear ends at 19 on an actuating element 20 movable axially by an actuator 29 which can be a screw arrangement or another pneumatic cylinder operate by the controller 27. These arms 15, 18 can therefore move between inner relatively straight positions shown diagrammatically in solid lines in FIG. 2 and outer positions shown in dashed lines in FIG. 2 and in solid lines in FIG. 5. The plane the arms 15, 18 flex in is canted somewhat so that their pivots 16 and 19 are further to the rear, down in FIG. 3, than their pivots 17.

In addition the front portion 14 is formed with an axial or longitudinal groove 22 along its back side in line with the axis A and has an inclined front and rear front end surface 23 from which a bladder 24 can be expanded by the controller 27.

Figure 4:
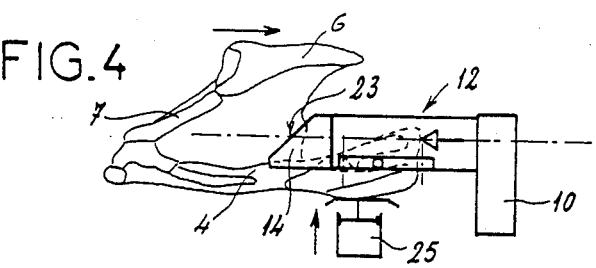
FIGS. 4 and 5 are respective side and top views showing the apparatus of this invention partly in the first stage of insertion into a body cavity of a gutted animal.
Figure 5:
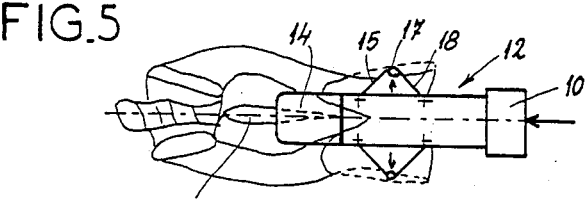
Figure 6:
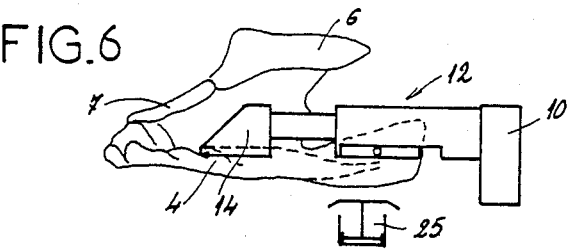
FIGS. 6 and 7 are side views of the second and third stages of insertion of the apparatus of this invention into the body cavity.
Figure 7:
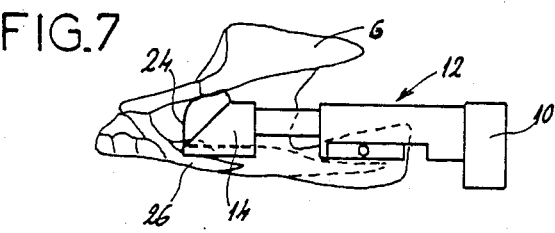

The rear portion 13 has a laterally projecting abutment 10 and the apparatus is initially inserted into the animal body with the aid of a pushing device 25 shown in FIG. 4.

In use the two portions 13 and 14 are, to start with, in the retracted position and the body 12 is inserted into the body cavity until the abutment 10 engages the rear end or tail 9. Then the controller 27 extends the two arms 15, 18 to engage them in the sciatic foramen 8 while the pusher 25 presses the back of the animal body against the underside of the body 12. Next the front portion 14 is advanced until it engages the forward curve 26 of the spine 4 which fits into the groove 22, and the bladder 24 is inflated. The result is that the animal body is held solidly and perfectly centered on the device, so that it gives good access to an operator who cuts off parts or otherwise works it. The abutment 10 can be stood on or fastened to a conveyor for movement of the held animal body past a succession of operators carrying out different tasks.

It is of course also possible to use means different from pneumatic cylinders to operate the mechanism. Cams or lever arrangements would also function. In addition for some animal bodies it might be advisable to insert the device into the front end of a cavity rather than the rear end. The entire apparatus can be covered with some hermetic membrane or the like to prevent bacteriological contamination of the foodstuff.

We claim:

1. An apparatus for holding a gutted animal body having an empty body cavity that has an open end and a closed end, the apparatus comprising:
   an elongated holder body having a front portion and a rear portion offset along a longitudinal axis of the holder body from the front portion;
   means interconnecting the portions for relatively axial displacing of same between an adjacent position and an axially spaced position;
   holding means on the front portion for engaging same in the closed end;
   holding means on the rear portion for engaging same adjacent the open end when the holding means of the front portion is engaged with the closed end; and
   control means connected to all of the other means for, on engagement of the holder body in the body cavity with the portions in the adjacent position for sequentially engaging the holding means of the one of the portions with the animal body adjacent the respective cavity end, then extension of the holder body into the spaced position, then engagement of the holding means of the other portion with the animal body at the other cavity end.

2. An apparatus for holding a gutted animal body having an empty body cavity that has an open end and a closed end, the apparatus comprising:
   an elongated holder body having a front portion and a rear portion offset along a longitudinal axis of the holder body from the front portion;
   means interconnecting the portions for relative axial displacement of same between an adjacent position and an axially spaced position;
   holding means on the front portion for engaging same in the closed end;
   holding means on the rear portion for engaging same adjacent the open end when the holding means of the front portion is engaged with the closed end; and
   control means connected to all of the other means for, on engagement of the holder body in the body cavity with the portions in the adjacent position for sequentially engaging the holding means of the rear portion with the animal body adjacent the open cavity end, then extension of the holder body into the spaced position, then engagement of the holding means of the front portion with the animal body at the closed cavity end.

3. The holding apparatus defined in claim 2 wherein the rear portion of the holder body is provided with an abutment engageable axially with the animal body around the open cavity end and thereby limiting insertion of the holder body into the cavity.

4. The holding apparatus defined in claim 2 wherein the animal body has a spine exposed in the cavity and the front portion is formed with an axially extending and outwardly open groove into which the spine is engageable.

5. The holding apparatus defined in claim 3 wherein the holding means of the rear portion include elements laterally engageable with the cavity.

6. The holding apparatus defined in claim 5 wherein the elements are centrally articulated arms each having one end secured to the rear body portion and another end axially displaceable relative to the respective one end, whereby movement of the other end toward the one arm end engages the arm outwardly against the cavity.

7. The holding apparatus defined in claim 6 wherein the holding means of the rear portion includes a pneumatic cylinder connected to the other arm ends.

8. The holding apparatus defined in claim 6 wherein each of the articulated arms lies and moves in a plane extending along the axis and inclined such that the arm moves somewhat ventrally when extended.

9. The holding apparatus defined in claim 2 wherein the front portion has a dorsally inclined front end.

10. The holding apparatus defined in claim 9 wherein the front end is provided with an inflatable bladder constituting the front holding means.

11. The holding apparatus defined in claim 2 wherein the means for displacing the portions includes a pneumatic cylinder operatively engaged between the front and rear portions.

* * * * *